United States Patent
Sale et al.

(10) Patent No.: US 7,861,601 B2
(45) Date of Patent: *Jan. 4, 2011

(54) MEASUREMENT OF LIQUID FLOW IN POROUS MEDIA BY TRACER DILUTION WITHOUT CONTINUOUS MIXING

(75) Inventors: Thomas C. Sale, Fort Collins, CO (US); Timothy J. Smith, Albany, CA (US); Mark Lyverse, Lafayette, CA (US)

(73) Assignees: Colorado State University Research Foundation, Fort Collins, CO (US); Chevron Corporation, San Ramon, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/399,862

(22) Filed: Mar. 6, 2009

(65) Prior Publication Data
US 2009/0223303 A1 Sep. 10, 2009

Related U.S. Application Data

(60) Provisional application No. 61/034,475, filed on Mar. 6, 2008.

(51) Int. Cl.
*G01F 1/704* (2006.01)
(52) U.S. Cl. ................................. 73/861.07
(58) Field of Classification Search ............. 73/861.07, 73/861.95, 61.55, 91.01, 863.23; 361/687; 123/41.63; 340/825.22
See application file for complete search history.

(56) References Cited

U.S. PATENT DOCUMENTS

| | | | | |
|---|---|---|---|---|
| 5,062,292 | A * | 11/1991 | Kanba et al. | 73/19.01 |
| 6,427,526 | B1 * | 8/2002 | Davison et al. | 73/61.55 |
| 6,706,188 | B2 * | 3/2004 | Carlsson et al. | 210/635 |
| 7,207,228 | B2 * | 4/2007 | Wang | 73/861.07 |
| 7,281,435 | B2 * | 10/2007 | Sale et al. | 73/861.07 |

OTHER PUBLICATIONS

Taylor, G.R., "Direct Measurement of LNAPL Flow in Porous Media Using Tracer Dilution Techniques," Masters Thesis, Colorado State University, Fort Collins, Colorado, 2004.
Sale, et al., "Measurement of LNAPL Flow Using Single-Well Tracer Dilution Techniques," Groundwater, 45, pp. 569-578, 2007.
Smith, Timothy J., "Direct Measurement of LNAPL Flow Using Single Well Periodic Mixing Reactor Tracer Tests," Masters Thesis, Colorado State University, Fort Collins, Colorado, 2008.

* cited by examiner

*Primary Examiner*—Jewel Thompson
(74) *Attorney, Agent, or Firm*—Samuel M. Freund; Cochran Freund & Young LLC

(57) ABSTRACT

A natural gradient, single well, tracer dilution non-continuous mixing apparatus and method for measuring flow of liquids through porous media are described. The method has been applied to concentrations of Light Nonaqueous Phase Liquid (LNAPL) in monitoring wells to measure the rate of LNAPL flow through the wells and through the adjacent formation. Similar measurements were made for concentrations of water in other formations. A LNAPL-soluble fluorescing tracer was added to LNAPL in the wells, and a water-soluble fluorescing tracer was added to water in the wells. The tracer is initially uniformly-mixed into the LNAPL or water in the well, and the tracer concentration is measured using a fiber optic cable and a spectrometer. The LNAPL or water with dissolved tracer is then allowed to flow from the well without any mixing. At a later time, the LNAPL or water and tracer in the well are mixed to a uniform tracer concentration, and the tracer concentration is remeasured. Using the initial tracer concentration, the subsequently mixed tracer concentration, the elapsed time, and the well diameter, a LNAPL flow rate is calculated.

28 Claims, 6 Drawing Sheets

MEASUREMENT OF LIQUID FLOW IN POROUS MEDIA BY TRACER DILUTION WITHOUT CONTINUOUS MIXING

RELATED CASES

The present application claims the benefit of provisional patent application Ser. No. 61/034,475 for "Resolution Of Fluid Stability Using Tracers" by Timothy J. Smith et al., filed on 6 Mar. 2008, which provisional application is hereby incorporated by reference herein for all that it discloses and teaches.

FIELD OF THE INVENTION

The present invention relates generally to measurement of liquid flow through porous media and, more particularly, to the use of tracer dilution for measuring liquid flow through porous media.

BACKGROUND OF THE INVENTION

Handling of petroleum liquids can be challenging, sometimes resulting in accumulation of such liquids beneath petroleum production, transmission, refining, and storage facilities. Petroleum liquids in subsurface environments are referred to as Light Non-Aqueous Phase Liquids (LNAPLs). LNAPLs may impact groundwater quality and indoor air quality, and may migrate into unimpacted soils and/or surface water bodies.

While active releases of LNAPL often expand, once the LNAPL release ceases, resistance to LNAPL flow increases due to LNAPL depletion associated with dissolution and volatilization. Furthermore, forces driving LNAPL migration diminish as LNAPL concentrations in release areas decay. A consequence of increased resistance to flow and decreased driving forces is that LNAPLs tend to become more stable with time. The stability of LNAPL plumes is often a key factor driving decisions for remedial measures at LNAPL sites.

U.S. Pat. No. 7,281,435 for "Measurement Of Non-Aqueous Phase Liquid Flow In Porous Media By Tracer Dilution" which issued to Thomas C. Sale et al. on 16 Oct. 2007, the teachings of which are hereby incorporated by reference herein, describes a single-well tracer dilution technique with continuous mixing used to measure LNAPL stability. The use of tracer dilution methods to measure LNAPL stability is easier and more accurate than estimates obtained using Darcy's equation since limitations on estimates of LNAPL flow using Darcy's equation include: (a) difficulties with accurately estimating formation conductivity to LNAPL; (b) difficulties with estimating the force driving LNAPL flow; and (c) difficulties with the assumptions inherent to field application of Darcy's equation, including an extensive continuum of a homogenous LNAPL.

SUMMARY OF THE INVENTION

Accordingly, an advantage of the present invention is to provide an apparatus and method for measuring fluid flow in porous media without requiring sustained in-well mixing over extended time periods.

Another advantage of the invention is to provide an apparatus and method for measuring fluid flow in porous media without requiring calibration of field equipment over extended time periods.

Additional non-limiting objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the tracer dilution method for measuring the flow rate of a liquid through a porous medium, hereof, includes the steps of: placing a well or boring in the porous medium in a flow path of the liquid, whereby the liquid establishes a column within the well having a thickness; introducing a chosen quantity of a tracer into the well or boring, the tracer being soluble in the liquid and having a measurable quality related to the concentration of the tracer in the liquid; mixing the tracer with the liquid after at least one time interval such that the resulting mixture is uniform; measuring the quality of the tracer after each mixing step; and determining the flow rate of the liquid based at least in part on the measured quality of the tracer after mixing.

In another aspect of the invention, and in accordance with its non-limiting objects and purposes, the tracer dilution apparatus for measuring the flow rate of a liquid through a porous medium, hereof, includes in combination: a well or boring located in the porous medium in the path of the flow of the liquid; insertion means for introducing a chosen quantity of a tracer which is soluble in the liquid and has a measurable quality related to the concentration of the tracer in the liquid, into the well or boring; mixing means for uniformly mixing the tracer with the liquid after the tracer is introduced into the well or boring, and at least one time interval thereafter; and measuring means for determining the quality of the tracer after each uniform mixing of the tracer with the liquid, thereby generating data characteristic of the concentration of the tracer from which the flow of the liquid is derived.

Benefits and advantages of the present invention include, but are not limited to, providing an apparatus and method for measuring fluid flow in porous media without requiring sustained in-well mixing over extended time periods, and without requiring calibration of field equipment over extended time periods.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a schematic representation of top view of a monitoring well illustrating tracer moving through the well as a function of tracer dilution with mixing at $t=t_0$ and $t=t_0+\Delta t$, while

FIG. 3A illustrates the LNAPL flow through a monitoring well in its path, while

DETAILED DESCRIPTION OF THE INVENTION

Briefly, the present invention includes measuring fluid flow in porous media and determining fluid stability from such measurements, using a single-well tracer dilution technique, wherein mixing of a tracer introduced into a fluid (for example, water or LNAPL) in a well or boring is conducted in a non-continuous manner. By non-continuous mixing, it is meant that mixing of the tracer and the fluid in a well or boring may be conducted only once or at discrete chosen times subsequent to the initial introduction of the tracer into the fluid along with thorough mixing of the tracer with the fluid. Field trials using continuous mixing tracer dilution tests in LNAPL have revealed limitations in the continuous mixing tracer dilution method. See, for example, Timothy J. Smith (2008), Direct Measurement Of LNAPL Flow Using Single Well Periodic Reactor Tracer Tests, MS Thesis, Department of Civil Engineering, Colorado State University, Fort Collins, Colo., the teachings of which are hereby incorporated by reference herein. For example, maintaining the calibration of sensitive field equipment and sustaining in-well tracer mixing over extended periods, were found to be difficult.

Maintaining calibration of sensitive field equipment and sustaining in-well tracer mixing over extended periods were found to be unnecessary using mixing in accordance with embodiments of the present invention. Additional advantages of the present invention include an ability to conduct a large number of concurrent tests at a single site, and an ability to conduct longer tests with greater accuracy and lower overall costs.

Figure 1:
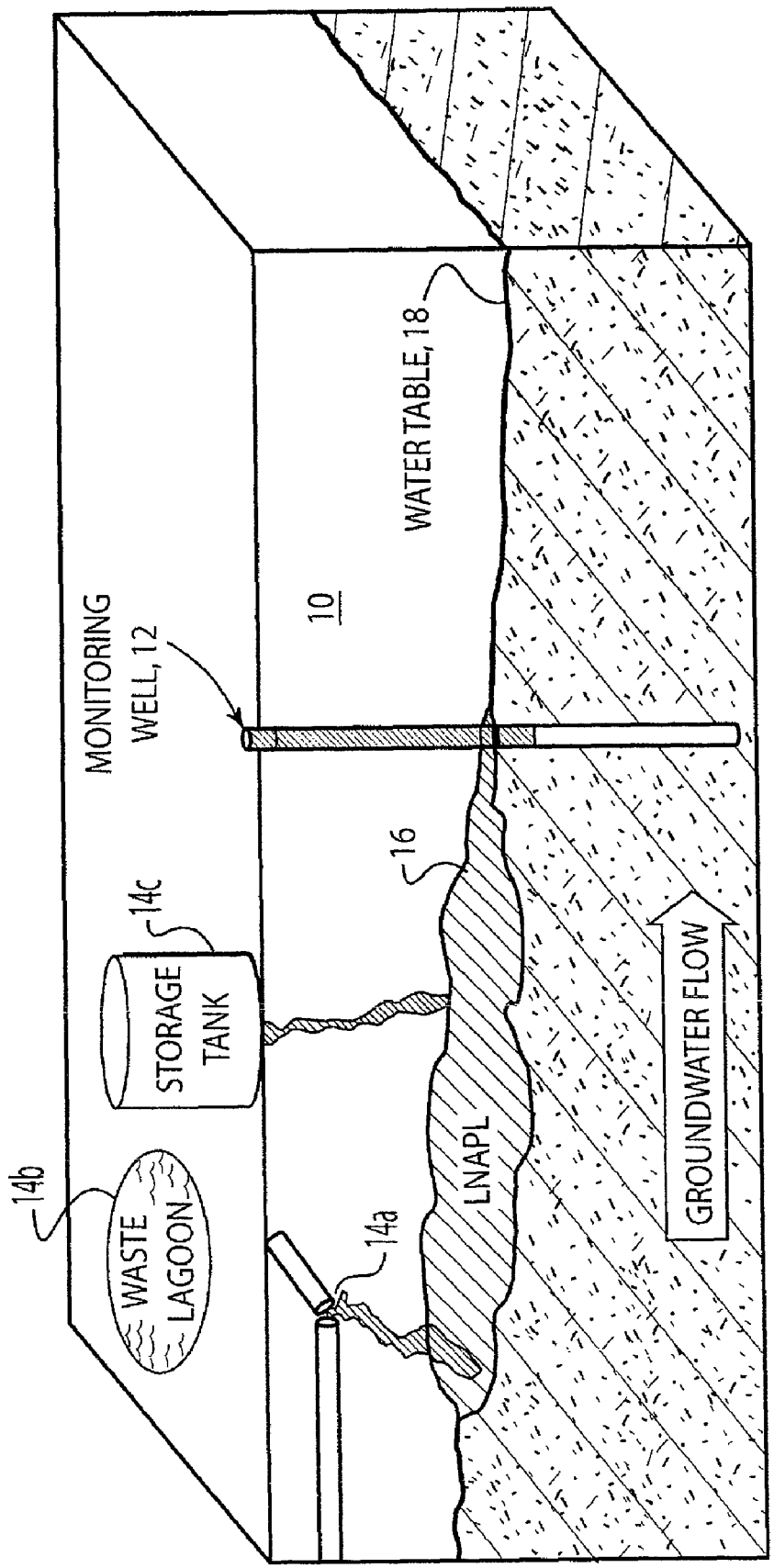
FIG. 1 is a schematic representation of a porous medium having an observation well located therein, and potential sources for LNAPL flow, such as a broken pipe, a waste lagoon, or a leaking storage tank.

Reference will now be made in detail to the present embodiments of the invention, examples of which are illustrated in the accompanying drawings. In the FIGURES, similar structure will be identified using identical reference characters. Turning now to the FIGURES, FIG. 1A is a schematic representation of porous medium, 10, having an observation well, 12, located therein, and potential sources of LNAPL, such as a broken pipe, 14a, a waste lagoon, 14b, or a leaking storage tank, 14c, as examples. The underground LNAPL pool, 16, occurs at the water table, 18.

Figure 2A:
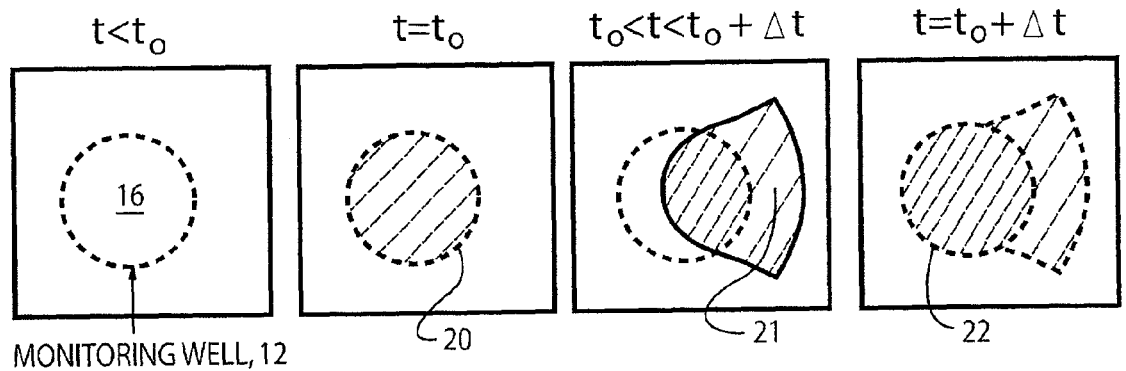
Figure 2B:
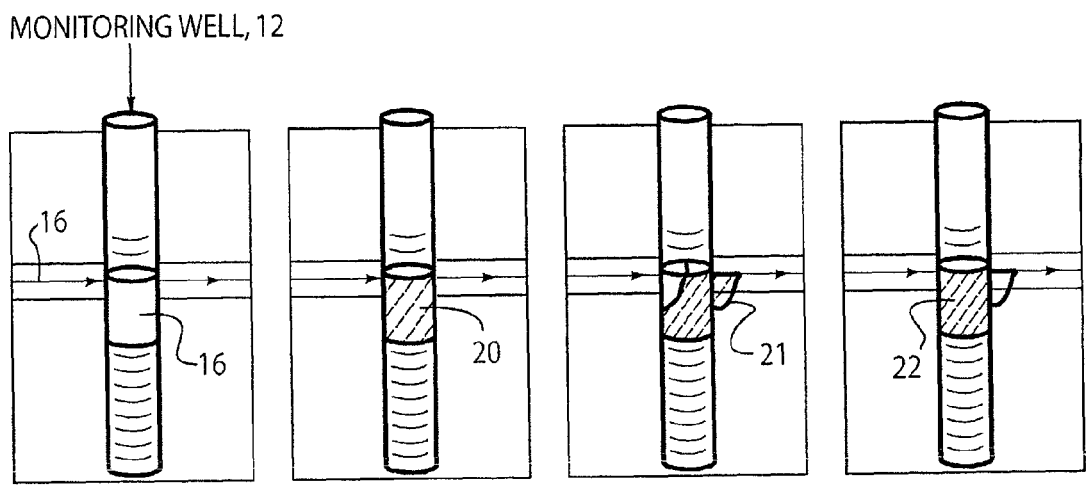
FIG. 2B shows a side view thereof.

FIG. 2A is a schematic representation of a top view of monitoring well 12 illustrating tracer moving through the well as a function of tracer dilution with mixing at $t=t_0$ and $t=t_0+\Delta t$, while FIG. 2B shows a side view thereof. An embodiment of the non-continuous mixing tracer dilution method of the present invention includes: (a) introducing a LNAPL soluble tracer into LNAPL 16 in well 12, and having the initial tracer and LNAPL well mixed at time $t_0$, 20; (b) allowing a chosen period of time $\Delta t$ to pass during which no mixing occurs, but an amount of tracer exits the well, 21; (c) at time $t+\Delta t$, remixing the remaining tracer and LNAPL in the well to a well-mixed condition, 22, and re-measuring the concentration of tracer in LNAPL in the well; and d) using the change in tracer concentration over the period $\Delta t$ to estimate the vertically averaged rate of LNAPL passing through the well and the adjacent formation.

Vertically averaged rates of LNAPL flux through a well, with mixing, as a function of tracer dilution, provide a quantitative estimate of LNAPL stability. An analytical solution for the flux of LNAPL through a well or boring as a function of these changes in tracer concentration in LNAPL (in a well) between mixing events will now be presented. Included are analyses of the limits on time between measurements and a comparison of non-continuous and continuous mixing solutions.

Figure 3A:
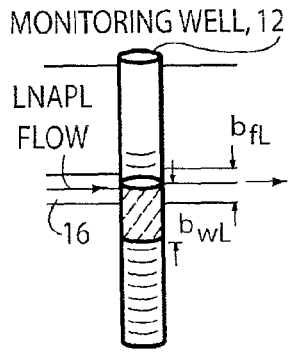
Figure 3B:
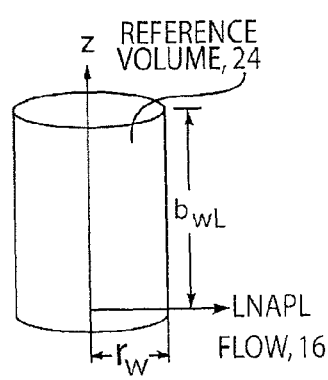
FIGS. 3B and 3C show the coordinate system of the reference volume utilized in the derivation of the equations for analyzing the fluid flow.
Figure 3C:
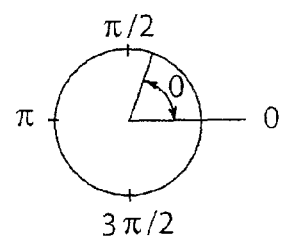

Equation (1) presents a mass balance for tracer in LNAPL in a well $$\frac{dm_T}{dt} = M_{T_{in}} - M_{T_{out}} \tag{1}$$

where $m_T$ is the mass of tracer in the LNAPL in the well (M), t is time (T), $M_{T_{in}}$ is the tracer mass inflow into well (M/T), and $M_{T_{out}}$ is the tracer mass outflow from well (M/T). Reference volume, 24, the coordinate system, and related variables are shown in FIG. 3. Three assumptions are employed. First, the concentration of tracer in LNAPL influent to the well is zero and, consequently, the mass flux of tracer into the well is zero. In cylindrical coordinates this equates to $$M_{T_{in}}\left[r_w, \frac{\pi}{2} \le \theta \le \frac{3\pi}{2}, 0 \le z \le b_{wL}, t_0 < t < t_0 + \Delta t\right] = 0 \tag{2}$$

where $r_w$ is the radius of monitoring well (L) and $b_{wL}$ is the thickness of LNAPL in the monitoring well (L). Secondly, diffusive transport is small relative to advective transport on the up-gradient and down gradient sides of the well; therefore, $$q_{wL}|_u C_T|_u >>> D^* \left.\frac{dC_T}{dr_w}\right|_u \tag{3}$$

$$q_{wL}|_d C_T|_d >>> D^* \left.\frac{dC_T}{dr_w}\right|_d \tag{4}$$

where $q_{wL}|_u$ is the LNAPL flow into the well from up-gradient side (L/T), $q_{wL}|_d$ is LNAPL flow out of the well from down-gradient side (L/T), $C_T|_u$ is the tracer concentration on the up-gradient side (M/L$^3$), $C_T|_d$ is the tracer concentration on the down-gradient side (M/L$^3$), and $D^*$ is the effective diffusion coefficient (L$^2$/T). Thirdly, it is assumed that LNAPL flow is at steady state.

From this it follows that:

$$Q_{wL}|_u = Q_{wL}|_d = q_{wL}, \text{ and} \quad (5)$$

$$A_u = A_d = A \quad (6)$$

where $q_{wL}$ is the LNAPL flux through the well (L/T), $A_u$ is the upgradient influent cross-sectional area normal to flow ($L^2$), and $A_d$ is the down gradient effluent cross-sectional area normal to the flow ($L^2$). From Equations (2) through (6), Equation (1) simplifies to $$\frac{dm_T}{dt} = -q_{wL} C_T|_d A. \quad (7)$$

Separation of the variables and integration yields:

$$\int_{m_{T_{t_0}}}^{m_{T_{t_0+\Delta t}}} dm_T = -q_{wL} C_T \bigg|_d A \int_{t_0}^{t_0+\Delta t} dt \quad (8)$$

Where $$m_{T_{t_0}}$$

is the initial mass of tracer in the well (M) and $$m_{T_{t_0+\Delta t}}$$

is the mass of tracer remaining in well (M) after the period $\Delta t$. The limits of integration are modified using $$m_{T_{t_0+\Delta t}} = m_{T_{t_0}} - m_{T_d} \quad (9)$$

and, equivalently $$V_{wL} C_{T_{t_0+\Delta t}} = V_{wL} C_{T_{t_0}} - V_{dL} C_{T_{t_0}} \quad (10)$$

where $m_{T_d}$ is the tracer mass displaced from the well, $V_{wL}$ is the volume of LNAPL in well, $$C_{T_{t_0+\Delta t}}$$

is the tracer concentration after remixing well, $$C_{T_{t_0}}$$

is the initial tracer concentration, and $V_{dL}$ is the volume of LNAPL displaced from the well. Employing Equation (10) and solving (8), the general solution for tracer dilution by non-continuous mixing is:

$$C_{T_{t_0+\Delta t}} = C_{T_{t_0}} \left(1 - \frac{V_{dL}}{V_{wL}}\right). \quad (11)$$

Since the monitoring well is cylindrical in shape, the volume of displaced LNAPL ($V_{dL}$) is nonlinear with respect to the travel distance through the well ($q_{wL}\Delta t$). The relationship between displaced volume and distance is $$V_{dL} = b_{wL} r_w^2 \left\{ \begin{array}{l} \pi - 2\alpha\cos\left(\frac{q_{wL}\Delta t}{2r_w}\right) + \\ \sin\left[2\alpha\cos\left(\frac{q_{wL}\Delta t}{2r_w}\right)\right] \end{array} \right\} \text{ for } q_{wL}\Delta t \leq 2r_w, \quad (12)$$

where $\alpha$ is the flow convergence factor discussed hereinbelow. A full derivation of Equation (12) is presented in Smith, supra.

Figure 4:
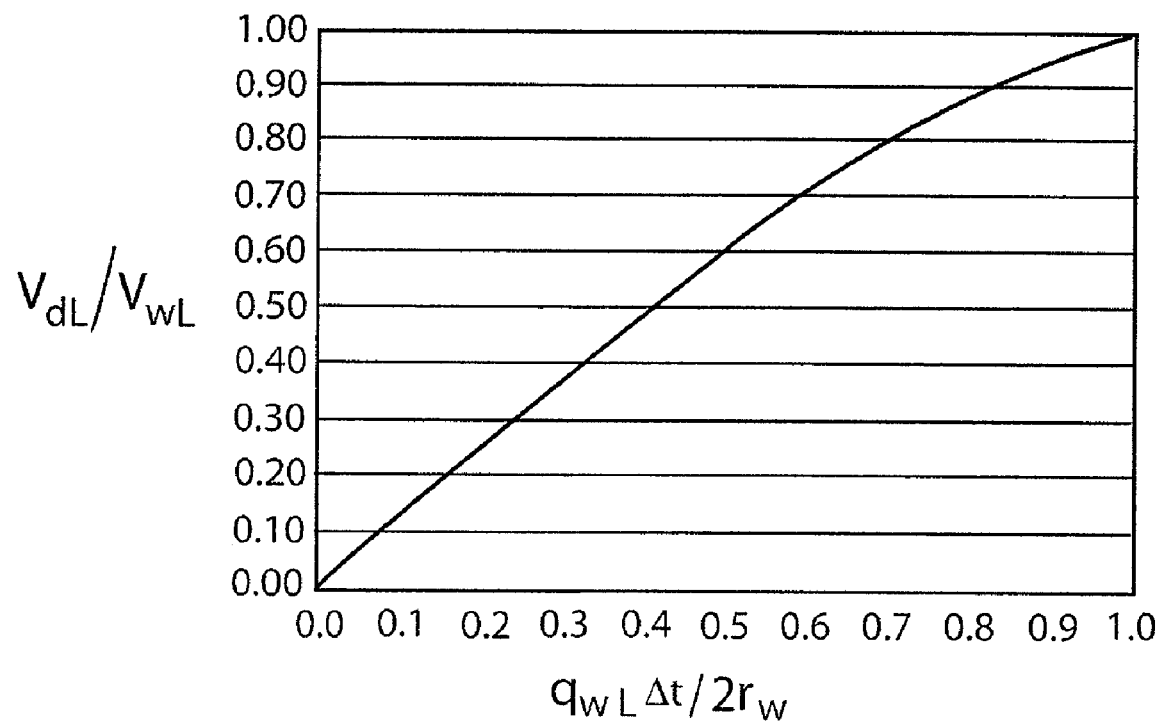
FIG. 4 is a graph of the normalized volume of displaced LNAPL ($V_{dL}/V_{wL}$) as a function of the travel distance across the well ($q_{wL}\Delta t/2r_w$), normalized to the diameter of the well, $2r_w$.

FIG. 4 is a graph of the normalized volume of displaced LNAPL ($V_{dL}/V_{wL}$) as a function of the travel distance across the well ($q_{wL}\Delta t/2r_w$), normalized to the diameter of the well, $2r_w$. Substituting Equation (12) into Equation (11) yields:

$$C_{\Delta t} = C_0 \left(\frac{2\alpha\cos\left(\frac{q_{wL}\Delta t}{D}\right) - \sin\left[2\alpha\cos\left(\frac{q_{wL}\Delta t}{D}\right)\right]}{\pi}\right), \quad (13)$$

where $C_{\Delta t}$ is the tracer concentration after remixing the well and $C_0$ is the initial tracer concentration, $\alpha$ is the flow convergence factor discussed hereinbelow, and D is the diameter of the well or boring. Equation (13) is a solution for a vertically averaged horizontal LNAPL flux through a monitoring well as a function of the change in tracer concentration over a period $\Delta t$.

Figures 5A, 5B:
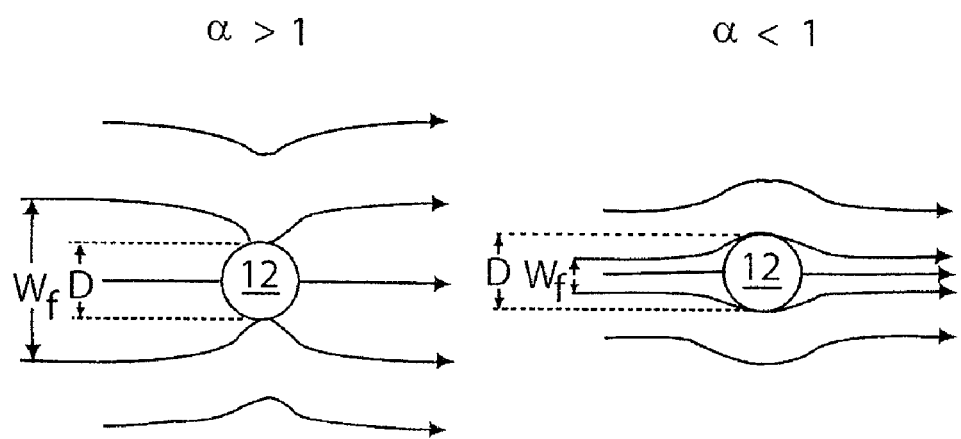
FIGS. 5A and 5B illustrates the flow convergence factor $\alpha$ for $\alpha>1$ and $\alpha<1$, respectively.

As shown by G. R. Taylor in "Direct Measurement Of LNAPL Flow Using Tracer Dilution Techniques" MS Thesis, Department of Civil Engineering, Colorado State University, Fort Collins, Colo., 2004, and in "Measurement Of LNAPL Flow Using Single-Well Tracer Dilution Techniques" by Sale et al., Groundwater 45, pages 569-578 (2007), measured LNAPL flow rates through a monitoring well may be converted to LNAPL flow rates through the adjacent geologic formation. FIGS. 5A and 5B illustrates the flow convergence factor $\alpha$ for $\alpha>1$ and $\alpha<1$, respectively, which reflects the varying resistance to flow in the formation, gravel pack, well screen, and well. R. A. Freeze and J. A. Cherry in *Groundwater*, Englewood Cliffs, N.J.: Prentice-Hall Publishing Company (1979), define the flow convergence factor as $$\alpha = \frac{W_f}{D}, \quad (14)$$

where $W_f$ is the average width of the stream tubes in the formation passing through the well (L), and D is the diameter of the well, $2r_w$.

The relationship between vertically averaged flow rate in the well and in the formation is:

$$q_{fL_{ave}} = \frac{q_{wL_{ave}}}{\alpha} \frac{b_{wL}}{b_{fL}}, \quad (15)$$

where $q_{fL_{ave}}$ is the vertically averaged LNAPL flow rate through the well (L/T), $q_{wL_{ave}}$ is the vertically averaged LNAPL flow rate through the formation (L/T), and $b_{fL}$ is the continuous thickness of LNAPL in the formation (L). Taylor, supra, and Sale et. al., supra, present additional transforms for the LNAPL velocity through the well to the vertically averaged formation conductivity to LNAPL and formation transmissivity to LNAPL.

Continuing the assumption of a uniform LNAPL flux through the well, the constraint on time between non-continuous mixing and measurement is $$\Delta t_{max} = 2r_w / q_{wL}. \tag{16}$$

However, LNAPL fluxes vary with vertical position in the well. This reflects vertical variation in LNAPL fluxes in the adjacent formation. A primary cause of vertical variations in LNAPL flux is variations in relative permeability in the formation. Given the assumption of a uniform formation, the following advances a more rigorous analysis of the limits on $\Delta t$.

LNAPL flow rate through the formation can be correlated to the maximum LNAPL flow rate through the well as $$q_{fL_{max}} = \frac{q_{wL_{max}}}{\alpha}. \tag{17}$$

Furthermore, the average and maximum LNAPL flow rates through the formation can be expressed using Darcy's equation as:

$$q_{fL_{ave}} = \frac{k_{rL_{ave}} k \rho_L g}{\mu_L} \frac{dh_L}{dx} \tag{18a}$$

$$q_{fL_{max}} = \frac{k_{rL_{max}} k \rho_L g}{\mu_L} \frac{dh_L}{dx} \tag{18b}$$

where $k_{rL_{ave}}$ is the average relative permeability to LNAPL (dimensionless), $k_{rL_{max}}$ is the maximum relative permeability to LNAPL (dimensionless), $k$ is the formation permeability ($L^2$), $\rho$ is the density of the LNAPL ($M/L^3$), $\mu_L$ is the dynamic viscosity of LNAPL (M/L-T), $h_L$ is the LNAPL head (L), and $x$ is the horizontal position (L). Substitution of Equations (18a) and (18b) into Equations (17) and (15), respectively, provides two expressions having $dh_L/dx$ in common. Equating the two expressions, solving for $q_{wL_{ave}}$, and substitution of the result into Equation (16) yields $$\Delta t_{max} = \frac{2r_w}{q_{wL}} \frac{k_{r_{ave}}}{k_{r_{max}}} \frac{b_{fL}}{b_{wL}}. \tag{19}$$

Equation (19) illustrates that consideration of the vertical variation in LNAPL flow in a uniform material reduces the constraint on the time between mixings by the ratio of the average and maximum relative permeability to LNAPL in the formation. Since Equation (19) ignores tracer diffusion within LNAPL in the well, Equation (19) is a conservation estimate of $\Delta t_{max}$. Additional analysis of the effects of vertical variation in flow into the well is presented in Smith, supra. If the change in tracer concentration over any period $\Delta t$ is less than 0.1, the error associated with non-uniform flow into the well will be small.

As the normalized displaced distance in the well goes to zero (for small $\Delta t$ and/or small $q_{wL}$), the non-continuously mixed solution condition converges to the continuously mixed solution presented in Taylor, supra, and Sale et al., supra:

$$C_t = C_0 e^{-\frac{4q_{wL} \Delta t}{\pi D}} \tag{20}$$

Figure 6:
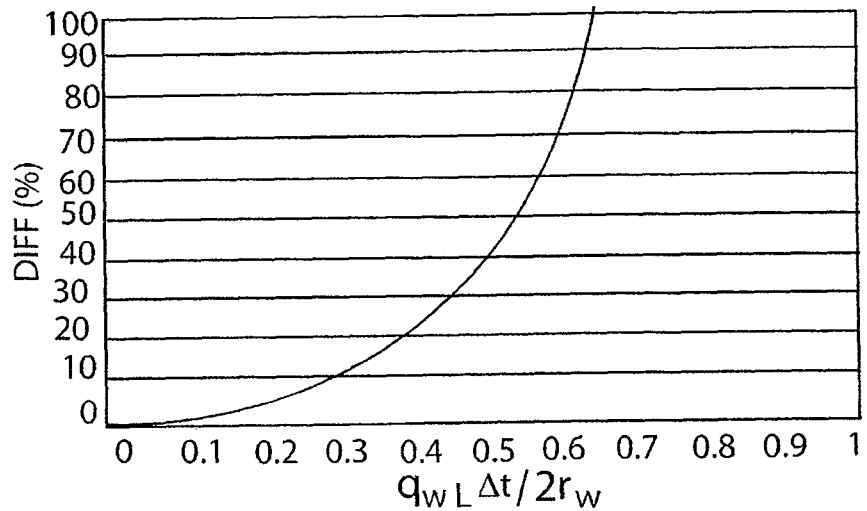
FIG. 6 is a graph of the difference, in percent, of the changes in tracer concentrations for the non-continuously and continuously mixed solutions, respectively, as a function of the normalized displaced distance in the well, $q_{wL}\Delta t/2r_w$.

FIG. 6 is a graph of the difference, in percent, of the changes in tracer concentrations for the non-continuous and continuously mixed solutions, respectively, as a function of the normalized displaced distance in the well, $q_{wL}\Delta t/2r_w$, as set forth in the Equation:

$$Diff\ (\%) = \left(\frac{\Delta C_{TPM} - \Delta C_{TCM}}{\Delta C_{TCM}}\right) 100, \tag{21}$$

where $\Delta C_{TPM}$ is the change in tracer concentration for the non-continuously mixed solution and $\Delta C_{TCM}$ is the change in tracer concentration for the continuously mixed solution. For small normalized displacement values ($q_{wL}\Delta t/D$), the tracer loss from the well can be analyzed assuming using either the continuously mixed or non-continuously mixed solutions.

Having generally described the invention, the following EXAMPLES provides additional details:

Example 1

Laboratory Experiments

Figure 7:
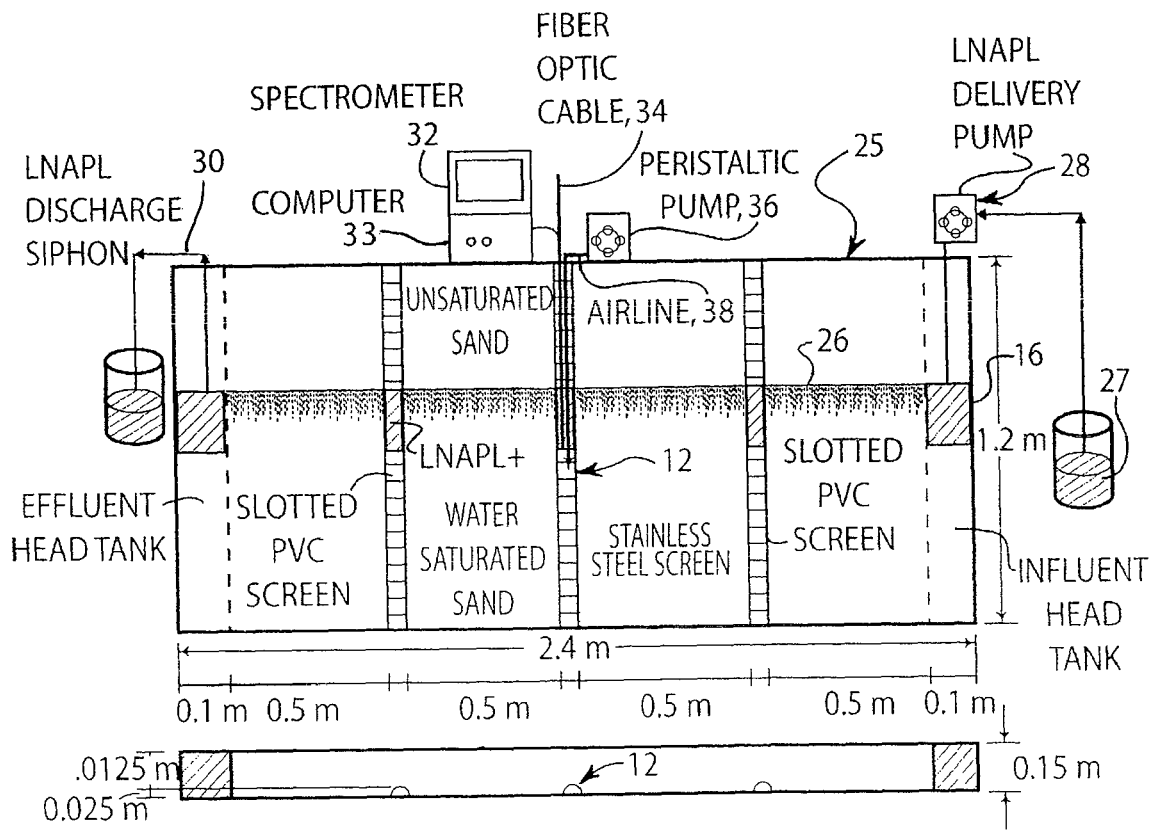
FIG. 7 is a schematic representation of a side view of a sand tank for conducting single-well, non-continuous mixing tracer dilution investigations in a controlled environment, over a range of LNAPL thicknesses and LNAPL flow rates.

Single-well, non-continuous mixing tracer dilution tests were conducted in a sand tank, a schematic representation of a side view thereof being illustrated in FIG. 7, in order to investigate the correspondence between measured LNAPL flow rates using non-continuous mixing tracer dilution with imposed LNAPL flow rates over a range of LNAPL thicknesses and LNAPL flow rates. The sand tank is described in more detail in Taylor, supra, and in Sale et al., supra, and is filled with Unium 4095, a well-sorted, medium-grained, angular quartz sand. Tests were conducted using center well 12 which contains a vertical half-section of a 2-in. inner diameter, 0.030 in. slot, wire wrap stainless steel well screen. The open section of the screen faces the glass in the tank, and a 1-in. filter pack consisting of well-sorted, coarse-grained, angular quartz sand (Unium 2095) was placed around the well screen. Initially, the tank was fully filled with tap water. Subsequently, the water level in the tank was drained to midpoint, 26, in the tank, and Soltrol 220™, a nonvolatile isoparaffin (LNAPL) dyed red with Sudan IV™, was released into the unsaturated zone using LNAPL delivery pump, 28, until a continuous body of LNAPL existed across the tank. LNAPL flow across the tank was imposed using delivery pump 28 and discharge siphon, 30.

BSL 715—Bright Solutions Inc., an automotive dye used to detect engine leaks was employed throughout. BSL 715 fluoresces at 545 nm and at 580 nm when excited with 470 nm light. Temperature-regulated UV-VIS spectrometer, 32, controlled by computer, 33, using commercial software was employed to measure changes in tracer concentration. Computer 33 may also keep track of the time after tracer introduction at $t=t_0$, analyze the data, correct the data for convergence of the liquid flow into the well or boring, and extract the rate of flow of the liquid from the corrected data. Light from a 470 nm light emitting diode (not shown in FIG. 7) directed into the LNAPL in well 12 using a six around one 10 m fiber optic cable, 34, was used to excite the tracer dissolved in the LNAPL. Six of the fibers transmitted the 470 nanometer light-source, and the seventh fiber relayed the in-well tracer fluorescence signal to the spectrometer.

Non-continuous mixing tracer dilution experiments were conducted using the LNAPL flow rates and thicknesses noted in TABLE 1. Three experiments were conducted under identical conditions, thereby providing a triplicate measurement for estimating the accuracy of the method. Prior to each experiment, LNAPL delivery pump 28 was adjusted to a known LNAPL flow rate and pumping conducted until steady-state fluid levels were achieved. Each experiment was initiated by adding sufficient BSL-715 to the LNAPL in well 12 to achieve a concentration of approximately 0.1 milliliters BSL 715 per liter of LNAPL. Over a period of a few minutes, the LNAPL and tracer in the well were mixed by slowly bubbling air through the LNAPL column using peristaltic pump, 36, and airline, 38. Using the spectrometer and fiber optic cable, the intensity of florescence at 454 nm was measured through the LNAPL to verify that the tracer was uniformly distributed in the LNAPL in the well.

TABLE 1

Large tank experiment-best fit flow convergence factors

| LNAPL Formation Thickness (cm) | Known LNAPL Discharge (mL/min) | Measured LNAPL Discharge (mL/min) | Flow Convergence Factor (unitless) | Percent Difference |
|---|---|---|---|---|
| 4.0 | 0.2 | 0.3 | 1.13 | 4.4 |
| 4.0 | 0.6 | 0.7 | 1.24 | 4.3 |
| 4.5 | 1.2 | 1.4 | 1.16 | 2.0 |
| 14.1 | 0.9 | 1.1 | 1.21 | 2.0 |
| 14.1 | 3.0 | 3.7 | 1.22 | 2.9 |
| 28.3 | 7.2 | 8.7 | 1.21 | 1.8 |
| 28.3 | 7.2 | 8.0 | 1.11 | 6.9 |
| 28.3 | 7.2 | 8.6 | 1.20 | 1.3 |
| Average Flow Convergence = | | 1.18 | | |
| One Standard Deviation = | | 0.05 | | |

The tracer in the well was mixed with the LNAPL using the airline, and tracer concentration was determined using the fiber optic cable and spectrometer as described hereinabove. Mixing and tracer concentration determination were repeated approximately 8 times for each experiment. At least 20% of the initial tracer concentration was displaced from the well during each experiment. Tracer concentrations were determined using the intensity of florescence at 545 nm. The relationship between intensity of florescence at 545 nm and concentration of BSL-517 is linear over the range of concentration expected to be used for tracer dilution experiments in LNAPL.

Figure 8:
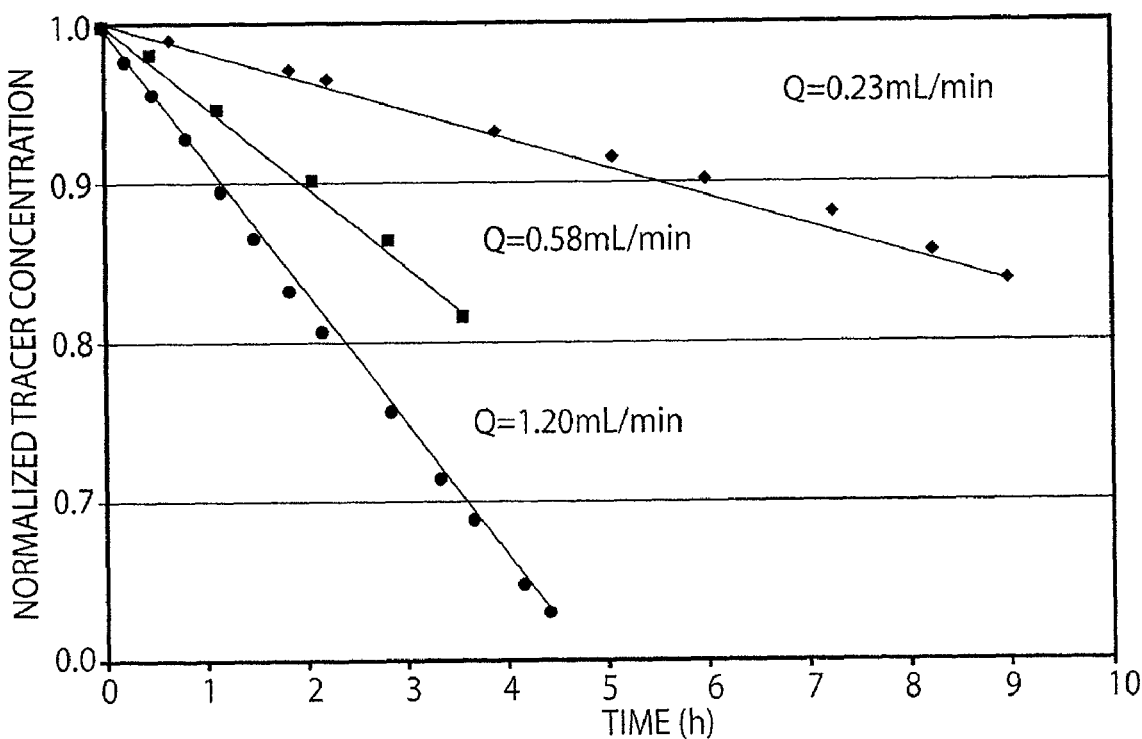
FIG. 8 is a graph of the normalized tracer concentration ($C_T(t)/C_T(0)$) as a function of time for the experiments described in TABLE 1, wherein the solid lines represent the predicted normalized tracer concentrations from Equation (13) given the actual LNAPL discharge through the sand tank and the average flow convergence factor from the experiments.

FIG. 8 is a graph of the normalized tracer concentration ($C_T(t)/C_T(0)$) versus time data for the experiments described in TABLE 1. The data points represent measured normalized tracer concentrations, while the solid lines represent the predicted normalized tracer concentrations from Equation (13) given the actual LNAPL discharge through the sand tank and the average flow convergence factor from the experiments. The in-well LNAPL thickness was 4 to 4.5 centimeters and the LNAPL discharges through the tank were 0.23, 0.58, and 1.20 milliliters per minute.

Figure 9:
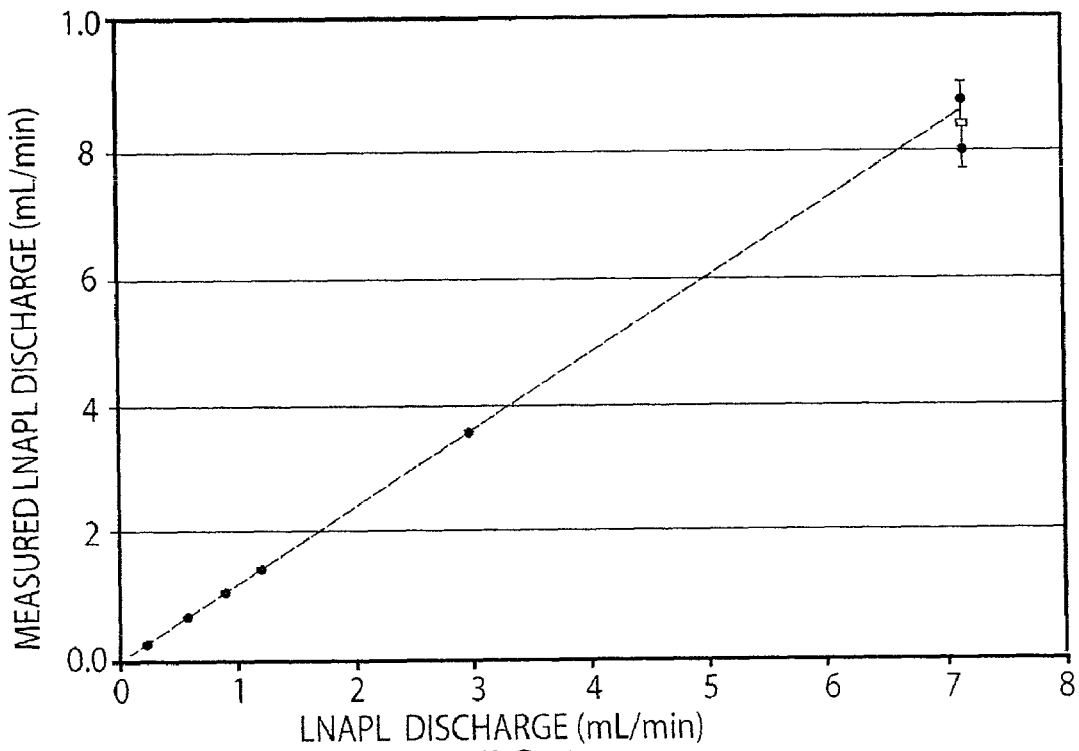
FIG. 9 is a graph of the measured LNAPL discharge as a function of the known LNAPL discharge.

FIG. 9 is a graph of the measured LNAPL discharge as a function of the known LNAPL discharge. The error bars represent the product of the known LNAPL discharge and one standard deviation of the average flow convergence factor calculated from the experiments set forth in TABLE 1. The solid line represents the product of the known LNAPL discharge and the average flow convergence factor. The average measured LNAPL discharge calculated from each experiment was set equal to the actual LNAPL discharge by varying the flow convergence factor using Equations (18a) and (18b). It should be mentioned that there is an intermediate step to convert the LNAPL discharge measured using the present non-continuous mixing experiments to the LNAPL discharge reported in FIG. 9. The LNAPL discharge measured in the non-continuous mixing experiments is the product of the LNAPL discharge per unit width normal to the flow in the monitoring well and the flow convergence factor. To convert the per unit width LNAPL discharge to the LNAPL discharge, the product of the measured LNAPL discharge from the non-continuous mixing experiments and the ratio of the tank width to the monitoring well cross sectional area was used. Since all of the experiments were performed in the same well, the flow convergence factors are the same (independent of LNAPL discharge or formation LNAPL thickness). No correlation was observed between LNAPL discharge and LNAPL thickness.

The variation in α values measured in the triplicate test most likely represents the limitations of the experimental method. These include spectrometer measurement error, incomplete mixing of the well, adverse flow caused by mixing, and/or pump drift throughout the tests. The range in measured flow convergence factors was found to be small relative to actual flow convergence factors that would have to be estimated in field applications. These flow convergence factors may be compared to those reported by Sale et. al., supra. TABLES 2 and 3 from Sale et. al. report flow convergence factors for 30 slot stainless steel wire wrap screen (TABLE 3) and for a three well screen sizes (TABLE 4). The flow convergence factors from both TABLES have been corrected to include the volume of LNAPL displaced due to the mixing tool being present in the well. The corrected flow convergence factors (for the 30 slot stainless steel, wire wrap well) agree with flow convergence factors measured using the present non-continuous mixing method. The flow convergence factors seen in TABLE 4 have also been corrected to take into account the volume of the tool.

TABLE 3

Estimated convergence factors, using the 30 slot stainless steel wire wrap well screen

| $b_f$ Formation LNAPL Thickness | $Q_w$ LNAPL Flow Rate Through Well (L/day) | α Convergence Factor reported in Sale et. al. (2007) | α Corrected Convergence Factor |
|---|---|---|---|
| 9 | 0.0033 | 1.5 | 1.1 |
| | 0.018 | 1.6 | 1.1 |
| | 0.022 | 1.5 | 1.2 |
| | 0.18 | 1.5 | 1.1 |
| | 0.98 | 2.0 | 1.5 |
| | 1.0 | 2.0 | 1.5 |
| 13 | 0.0050 | 1.5 | 1.1 |
| | 0.099 | 1.4 | 1.0 |
| | 0.86 | 1.3 | 1.0 |
| 24 | 0.037 | 2.2 | 1.7 |
| | 0.23 | 1.7 | 1.3 |
| | 2.8 | 1.75 | 1.2 |

TABLE 4

Measured % LNAPL flow through wells and convergence factors for three different well screens

| Well Screen | α-Convergence Factor |
| --- | --- |
| 5 cm ID wire wrap stainless steel (0.030 inch slots) | 1.2 |
| 5 cm ID factory slotted PVC (0.030 inch slot) | 0.65 |
| 5 cm ID factory slotted PVC (0.010 inch slot) | 0.56 |

Example 2

Field Experiments

Figure 10A:
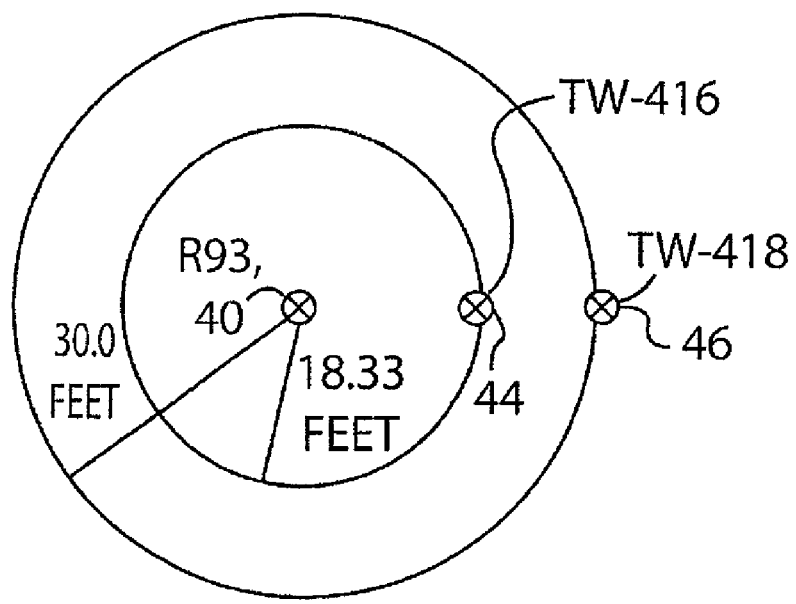
FIGS. 10A and 10B are schematic illustrations of two active recovery wells R-93 and R-91 investigated using the method and apparatus of the present invention, respectively.
Figure 10B:
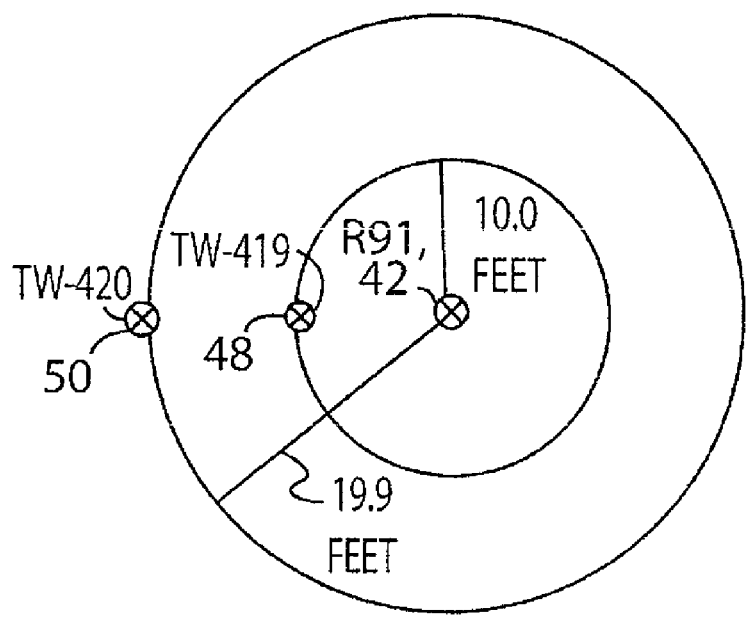

A first set of measurements involved determining LNAPL fluxes through monitoring wells adjacent to active LNAPL recovery wells to evaluate whether LNAPL fluxes at the wells agreed with LNAPL fluxes at the production wells. A second set of experiments involved measuring LNAPL flow rates in monitoring wells in areas where LNAPL bodies are thought to be largely stable for providing a basis for estimating the minimum LNAPL fluxes that can be measured. Sediments in the intervals where LNAPL is observed consist of fine to medium quartz feldspar sand. The two active recovery wells (R-93, 40, and R-91, 42) employed in the study and associated 2-inch monitoring wells are illustrated in FIGS. 10A and 10B, respectively. The thickness of LNAPL in monitoring wells TW-416, 44, TW-418, 46, TW419, 48, and TW420, 50, were 0.61 ft, 0.65 ft, 0.28 ft, and 0.57 ft, respectively. These wells include 30-slot PVC well screens and coarse gravel packs. Based on monthly data, recovery rates from R-93 and R-91 were 37 and 85 gallons/day, respectively. Tracer dilution tests were conducted at a fifth well (113, not shown in FIGS. 10A and 10B) that was located in an area of anticipated LNAPL stability. This well is a 4-inch completion well with a 20-slot PVC pipe well screen.

Procedures employed for initiating tests, mixing, and measuring tracer concentrations were the same as those described for the laboratory studies, except that in the wells, field standards were used to calibrate the spectrometer each time tracer concentrations were measured. To correct for the dependence on ambient air temperature of the spectrometer and the fact that the site LNAPL had background levels of florescence at 545 nm at the recovery wells, a fourth well was employed for the standards. Initially, a blank PVC pipe was placed through the LNAPL in the calibration well to occlude a volume of LNAPL in the well with no tracer ($C_0$). Tracer was then added to the LNAPL in the calibration well and mixed. A second blank PVC pipe was placed through the LNAPL in the calibration well occluding a volume of LNAPL with 100% of the initial tracer concentration ($C_{100}$). Procedures for well 113 were the same, except that an isolation casing for the standards was placed in well 113.

Mixing of the tracer and the fluid in a well may be accomplished using a number of procedures including: placing an air line into the fluid and bubbling air therethrough; rotating the in-well standard pipes in the well to mix the fluid; raising and lowering a solid object (for example, a sample bottle) through the fluid using a line or a solid pipe; and operating a low-flow pump coupled to a mixing system in the fluid column, as examples. An example of a diffusive mixer found to be effective for laboratory and field use for continuous mixing situations including, in particular, a tracer introduction tube, is described in detail in the '435 patent, supra, and in Sale et al., supra. It is expected that this mixer will be effective for the mixing requirements of the present invention. Vertical sets of 6.5-mm inner diameter stainless steel diffuser tubes having 1-mm perforations located on offset 2.5 cm centers, and a low-flow peristaltic pump for mixing are shown. The diffuser tubes may be alternated as intake and exhaust tubes. The fiber optic cable for tracer detection may be mounted in the recirculation loop. In all cases, mixing is continued until the tracer and the fluid in the well are uniformly mixed. Uniform tracer distribution is verified by in situ measurement of the tracer concentration as a function of position in the fluid column. For tracer concentration measurements where a fiber optic cable and a spectrometer are employed, concentration as a function of position may be determined by raising and lowering the fiber optic cable through the fluid column while recording the intensity of fluorescence.

Using the standards normalized field concentration were determined as:

$$C^* = \frac{I_{well} - I_{C_0}}{I_{C_{100}} - I_{C_0}}. \tag{22}$$

Example 3

Field Experiments Using Water

The non-continuous mixing tracer dilution method of the present invention was used to measure rates of groundwater flow at five wells completed in an alluvial aquifer. Fluorescein was used as the water soluble tracer at an approximate concentration of 10 mg/L. Due to the small size of the wells (1-inch I.D.), in-well standards could not be placed in each the wells. Alternatively, a single well with no tracer was used as the zero concentration in-well standard. A second well, equipped with a small pipe, closed at the bottom and filled with formation water in which fluorescein was dissolved, was used as the 100% concentration in-well standard. Tracer concentrations were measured 5 times over a period of approximately 24 h. Prior to each measurement, tracer and water in the wells was remixed to achieve a uniform distribution of tracer in the water, in the wells. Changes in tracer concentrations between mixing events were used to estimate groundwater velocities following methods set forth in Smith, supra.

Thus, the non-continuous mixing method of the present invention is performed by injecting an oil soluble or water soluble fluorescent tracer into LNAPL or into water, respectively, in a monitoring well, and uniformly mixing the LNAPL or water with the tracer. The solution of LNAPL or water and tracer is permitted to flow from the well under natural gradients. At a chosen later time, the LNAPL or water and tracer in the well are remixed to a uniformly-mixed condition. A vertically averaged horizontal LNAPL or water flow rate can then be calculated using the change in tracer concentration, the elapsed time, and the well diameter. Tracer concentrations may be measured using a UV-Vis spectrometer, and the well may be mixed using an airline as an example. An advantage of the non-continuous mixing method over the continuous mixing methods in LNAPL or water is simpler deployment. In the conduct of non-continuous mixing measurements, no dedicated downhole equipment is needed, whereas for continuous mixing, there must be apparatus for continually mixing the tracer with the LNAPL or water in the well. Another advantage of non-continuous mixing when compared to a Darcy based approach is the elimination of estimation of input parameters. Laboratory investigation of LNAPL discharges measured using the non-continuous mixing method of the present invention agrees closely with actual LNAPL discharges through the tank when a flow convergence factor is applied. Further, an average flow convergence factor was measured which is in agreement with flow convergence factors measured in the same sand tank using continuous mixing (Sale et. al., supra).

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A tracer dilution method for measuring the flow rate of a liquid through a porous medium, comprising the steps of:
    placing a well or boring in the porous medium in a flow path of the liquid, whereby the liquid establishes a column within the well having a thickness;
    introducing a chosen quantity of a tracer into the well or boring at time $t=t_0$, the tracer being soluble in the liquid and having a measurable quality related to the concentration of the tracer in the liquid;
    mixing the tracer with the liquid after at least one time interval $\Delta t$ such that the resulting mixture is uniform;
    measuring the quality of the tracer after each mixing step; and
    determining the flow rate of the liquid based at least in part on the measured quality of the tracer after mixing.

2. The method of claim 1, further comprising the steps correcting the data for the convergence of the liquid flow into the well or boring; and extracting the rate of flow of liquid from the corrected data using a programmable computer.

3. The method of claim 1, wherein $\Delta t$ is tracked using a programmable computer.

4. The method of claim 1, wherein during the period $\Delta t$, the change in tracer concentration is less than 10%.

5. The method of claim 1, wherein the time interval $\Delta t$ is less than or equal to $$\frac{2r_w}{q_{wL}} \frac{k_{r_{ave}}}{k_{r_{max}}} \frac{b_{fL}}{b_{wL}},$$

where $r_w$ is the radius of the monitoring well or boring, $q_{wL}$ is the liquid flux through the well or boring, $k_{r_{ave}}$ is the average relative permeability to LNAPL, $k_{r_{max}}$ is the maximum relative permeability to LNAPL, $b_{fL}$ is the continuous thickness of LNAPL in the formation, and $b_{wL}$ is the thickness of LNAPL in the monitoring well.

6. The method of claim 1 wherein said step of correcting the data for the convergence of the liquid flow into the well or boring comprises the step of fitting the data to the equation:

$$C_{\Delta t} = C_0 \left( \frac{2\alpha\cos\left(\frac{q_{wL}\Delta t}{D}\right) - \sin\left[2\alpha\cos\left(\frac{q_{wL}\Delta t}{D}\right)\right]}{\pi} \right),$$

where $C_{\Delta t}$ is the tracer concentration after remixing the well and $C_0$ is the initial tracer concentration, $\alpha$ is the flow convergence factor, and D is the diameter of the well or boring, $2r_w$.

7. The method of claim 1, wherein said step of mixing the tracer with the liquid is achieved using diffusive mixing.

8. The method of claim 1, wherein the liquid is chosen from water and light Nonaqueous Phase Liquids (LNAPL).

9. The method of claim 8, wherein the tracer comprises a fluorescent material and the measurable quality comprises fluorescence.

10. The method of claim 9, wherein the fluorescent material comprises fluorescein when the liquid comprises water.

11. The method of claim 9, wherein the fluorescent material comprises Stay-Bright™ BSL 715 when the liquid comprises LNAPL.

12. The method of claim 9, wherein said step of measuring the fluorescence of the fluorescent material further comprises the steps of optically exciting the fluorescent material using light having a chosen wavelength thereby generating fluorescence therefrom, and detecting the resulting fluorescence.

13. The method of claim 12, wherein said step of detecting the fluorescence further comprises the steps of spectroscopically resolving the wavelengths of the fluorescence using a spectrometer, and measuring the intensity of chosen wavelengths.

14. The method of claim 13, wherein an in-well field standard is used to calibrate the spectrometer.

15. A tracer dilution apparatus for measuring the flow rate of a liquid through a porous medium, comprising in combination:
    (a) a well or boring located in the porous medium in the path of the flow of the liquid;
    (b) insertion means for introducing a chosen quantity of a tracer which is soluble in the liquid and has a measurable quality related to the concentration of the tracer in the liquid, into said well or boring;
    (c) mixing means for uniformly mixing the tracer with the liquid at a time $t=t_0$, when a chosen quantity of the tracer is introduced into said well or boring, and at least one time interval $\Delta t$ thereafter; and
    (d) means for measuring the quality of the tracer after each uniform mixing of the tracer with the liquid, thereby generating data characteristic of the concentration of the tracer from which the flow of the liquid is derived.

16. The apparatus of claim 15, wherein said mixing means comprises diffusive mixing means.

17. The apparatus of claim 15, further comprising a programmable computer for tracking $\Delta t$.

18. The apparatus of claim 17, wherein said programmable computer further analyzes the generated data, corrects said data for the convergence of the liquid flow into the well or boring, and extracts the rate of flow of liquid from the corrected data.

19. The apparatus of claim 15, wherein during the period $\Delta t$, the change in tracer concentration is less than 10%.

20. The apparatus of claim 15, wherein the time interval $\Delta t$ is less than or equal to $$\frac{2r_w}{q_{wL}} \frac{k_{r_{ave}}}{k_{r_{max}}} \frac{b_{fL}}{b_{wL}},$$

where $r_w$ is the radius of the monitoring well or boring, $q_{wL}$ is the liquid flux through the well or boring, $k_{r_{ave}}$ is the average relative permeability to LNAPL, $k_{r_{max}}$ is the maximum relative permeability to LNAPL, $b_{fL}$ is the continuous thickness of LNAPL in the formation, and $b_{wL}$ is the thickness of LNAPL in the monitoring well.

21. The apparatus of claim 15, wherein the data generated by said means for measuring the quality of the tracer after each uniform mixing of the tracer with the liquid, is fitted to the equation:

$$C_{\Delta t} = C_0 \left( \frac{2\alpha\cos\left(\frac{q_{wL}\Delta t}{D}\right) - \sin\left[2\alpha\cos\left(\frac{q_{wL}\Delta t}{D}\right)\right]}{\pi} \right),$$

where $C_{\Delta t}$ is the tracer concentration after remixing the well and $C_0$ is the initial tracer concentration, $\alpha$ is the flow convergence factor, and D is the diameter of the well or boring, $2r_w$.

22. The apparatus of claim 15, wherein the liquid is chosen from water and light non-aqueous phase liquids (LNAPL).

23. The apparatus of claim 22, wherein the tracer comprises a fluorescent material and the measurable quality comprises fluorescence.

24. The apparatus of claim 23, wherein the fluorescent material comprises fluorescein when the liquid comprises water.

25. The apparatus of claim 23, wherein the fluorescent material comprises Stay-Bright™ BSL 715 when the liquid comprises LNAPL.

26. The apparatus of claim 23, wherein said means for measuring the fluorescence of the fluorescent material comprises means for optically exciting the fluorescent material using light having a chosen wavelength, thereby generating fluorescence therefrom, and means for measuring the resulting fluorescence.

27. The apparatus of claim 26, wherein said means for measuring the fluorescence further comprises a spectrometer for spectroscopically resolving the wavelengths of the fluorescence, and a detector for measuring the intensity of chosen wavelengths.

28. The apparatus of claim 27, further comprising an in-well field standard for calibrating said spectrometer.

* * * * *